United States Patent
Miyao et al.

(10) Patent No.: US 10,782,602 B2
(45) Date of Patent: Sep. 22, 2020

(54) PROJECTION DISPLAY DEVICE

(71) Applicant: SONY CORPORATION, Tokyo (JP)

(72) Inventors: Ryo Miyao, Tokyo (JP); Mariko Obinata, Kanagawa (JP); Masa Tanaka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 64 days.

(21) Appl. No.: 16/095,122

(22) PCT Filed: Mar. 21, 2017

(86) PCT No.: PCT/JP2017/011206
§ 371 (c)(1),
(2) Date: Oct. 19, 2018

(87) PCT Pub. No.: WO2017/187844
PCT Pub. Date: Nov. 2, 2017

(65) Prior Publication Data
US 2020/0110328 A1 Apr. 9, 2020

(30) Foreign Application Priority Data

Apr. 27, 2016 (JP) ................... 2016-089056

(51) Int. Cl.
*G03B 21/20* (2006.01)
*H04N 9/31* (2006.01)
(Continued)

(52) U.S. Cl.
CPC ............. *G03B 21/204* (2013.01); *F21V 9/30* (2018.02); *H04N 9/3161* (2013.01);
(Continued)

(58) Field of Classification Search
CPC ............. G03B 21/2013; G03B 21/204; G03B 21/2033; G03B 21/208; G03B 21/142;
(Continued)

(56) References Cited

U.S. PATENT DOCUMENTS

| 2007/0097331 A1 | 5/2007 | Sadler et al. |
| 2008/0266527 A1* | 10/2008 | Fuse ................. G03B 5/04 353/38 |

(Continued)

FOREIGN PATENT DOCUMENTS

| CN | 101546107 A | 9/2009 |
| CN | 101666436 A | 3/2010 |

(Continued)

OTHER PUBLICATIONS

International Search Report and Written Opinion of PCT Application No. PCT/JP2017/011206, dated Jun. 27, 2017, 8 pages of ISRWO.

*Primary Examiner* — Ryan D Howard
(74) *Attorney, Agent, or Firm* — Chip Law Group

(57) ABSTRACT

A projection display device includes a light source part including a first light source part that emits first color light and a second light source part that emits second color light having an emission intensity distribution different from that of the first color light, an image generator that generates an image on a basis of light emitted from the light source part, and a projection lens that projects the light outputted from the image generator onto a projection surface and has a projection optical axis that is shifted from a reference optical axis of the device as a whole. An emission optical axis of the first light source part is shifted to a direction opposite to a direction of the projection optical axis having been shifted.

7 Claims, 12 Drawing Sheets

(51) Int. Cl.
*F21V 9/30* (2018.01)
*F21V 9/40* (2018.01)
*F21S 2/00* (2016.01)

(52) U.S. Cl.
CPC .............. *H04N 9/3164* (2013.01); *F21S 2/00* (2013.01); *F21V 9/40* (2018.02)

(58) Field of Classification Search
CPC .... G03B 21/147; H04N 9/3152; H04N 9/315; H04N 9/3164
See application file for complete search history.

(56) References Cited

U.S. PATENT DOCUMENTS

| | | |
|---|---|---|
| 2009/0244498 A1 | 10/2009 | Matsubara et al. |
| 2010/0053564 A1 | 3/2010 | Itoh |
| 2012/0008102 A1 | 1/2012 | Destain |
| 2012/0242966 A1* | 9/2012 | Saito .................... G03B 21/142 353/100 |
| 2013/0201458 A1 | 8/2013 | Kashiwagi et al. |
| 2015/0277217 A1 | 10/2015 | Takamatsu et al. |
| 2016/0091712 A1* | 3/2016 | Egawa ................. G03B 21/204 353/31 |

FOREIGN PATENT DOCUMENTS

| | | |
|---|---|---|
| CN | 103080833 A | 5/2013 |
| CN | 104736931 A | 6/2015 |
| JP | 2009-237433 A | 10/2009 |
| JP | 2010-062019 A | 3/2010 |
| JP | 2011-100102 A | 5/2011 |
| JP | 2013-162020 A | 8/2013 |
| JP | 2013-532313 A | 8/2013 |
| JP | 2014-085623 A | 5/2014 |
| WO | 2007/047682 A2 | 4/2007 |
| WO | 2012/006614 A2 | 1/2012 |
| WO | 2014/064877 A1 | 5/2014 |

* cited by examiner

[FIG. 1]
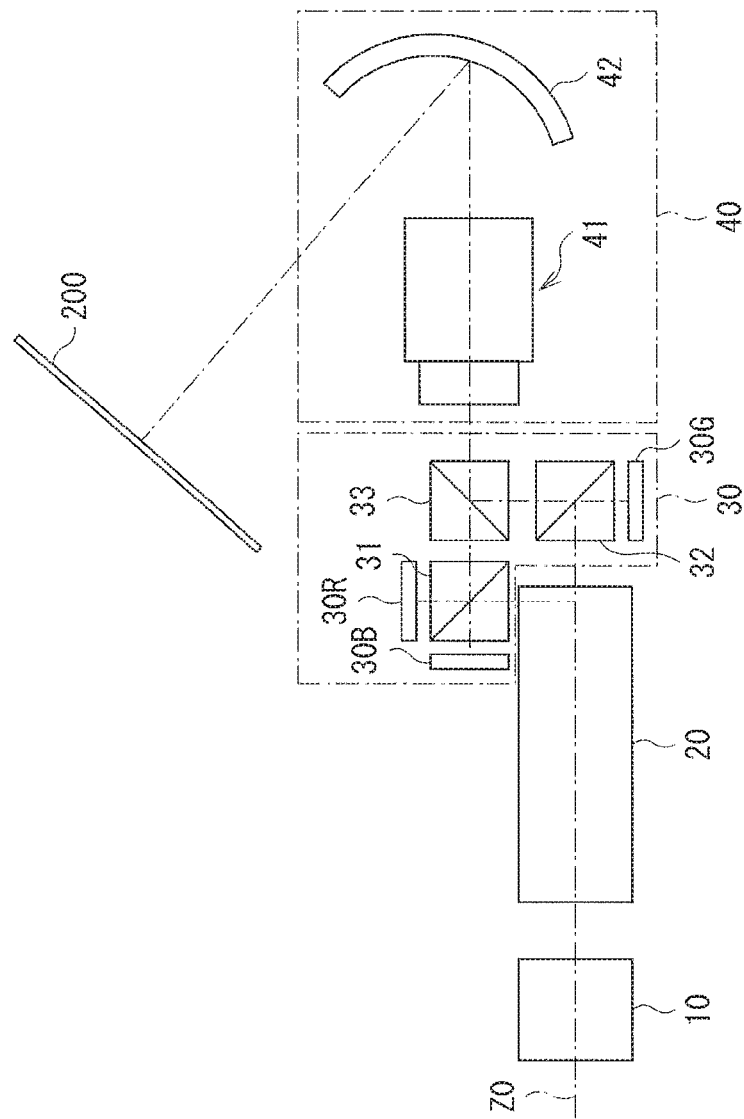

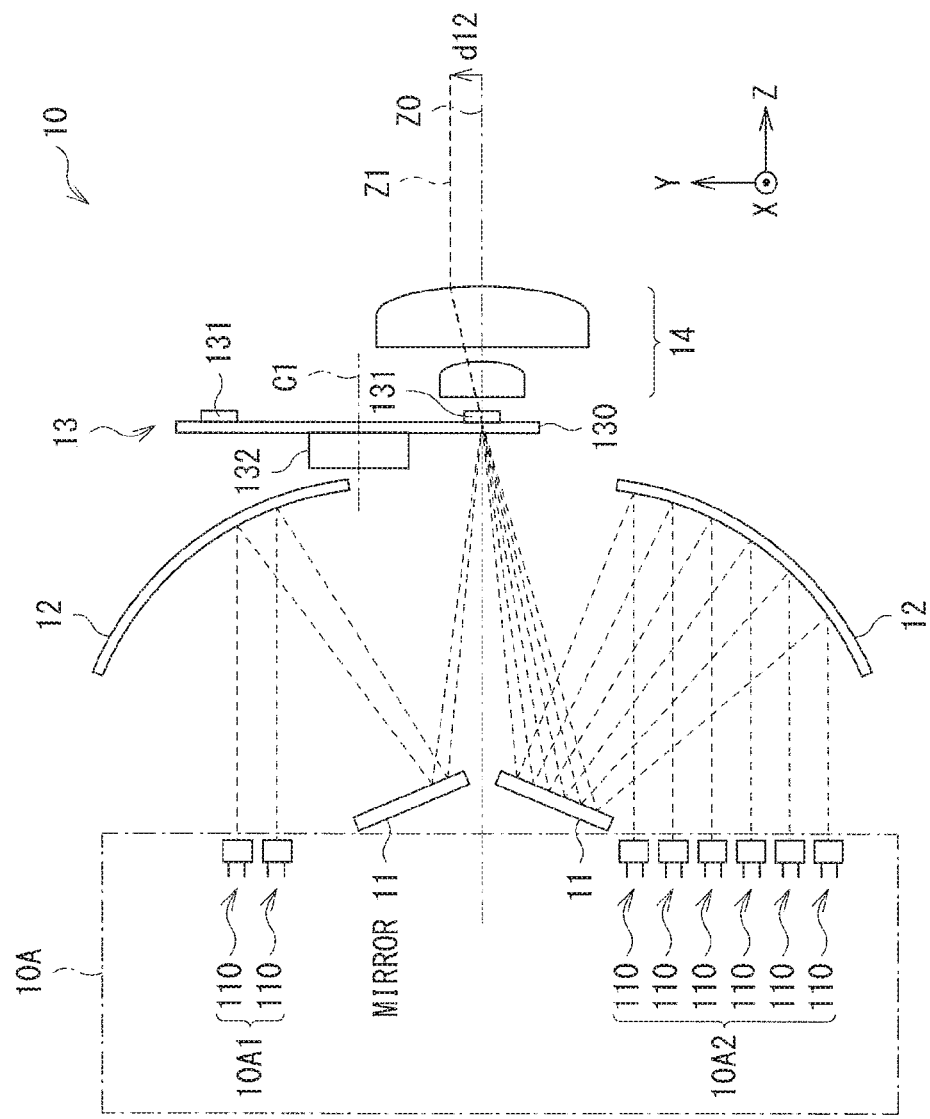
[FIG. 2]

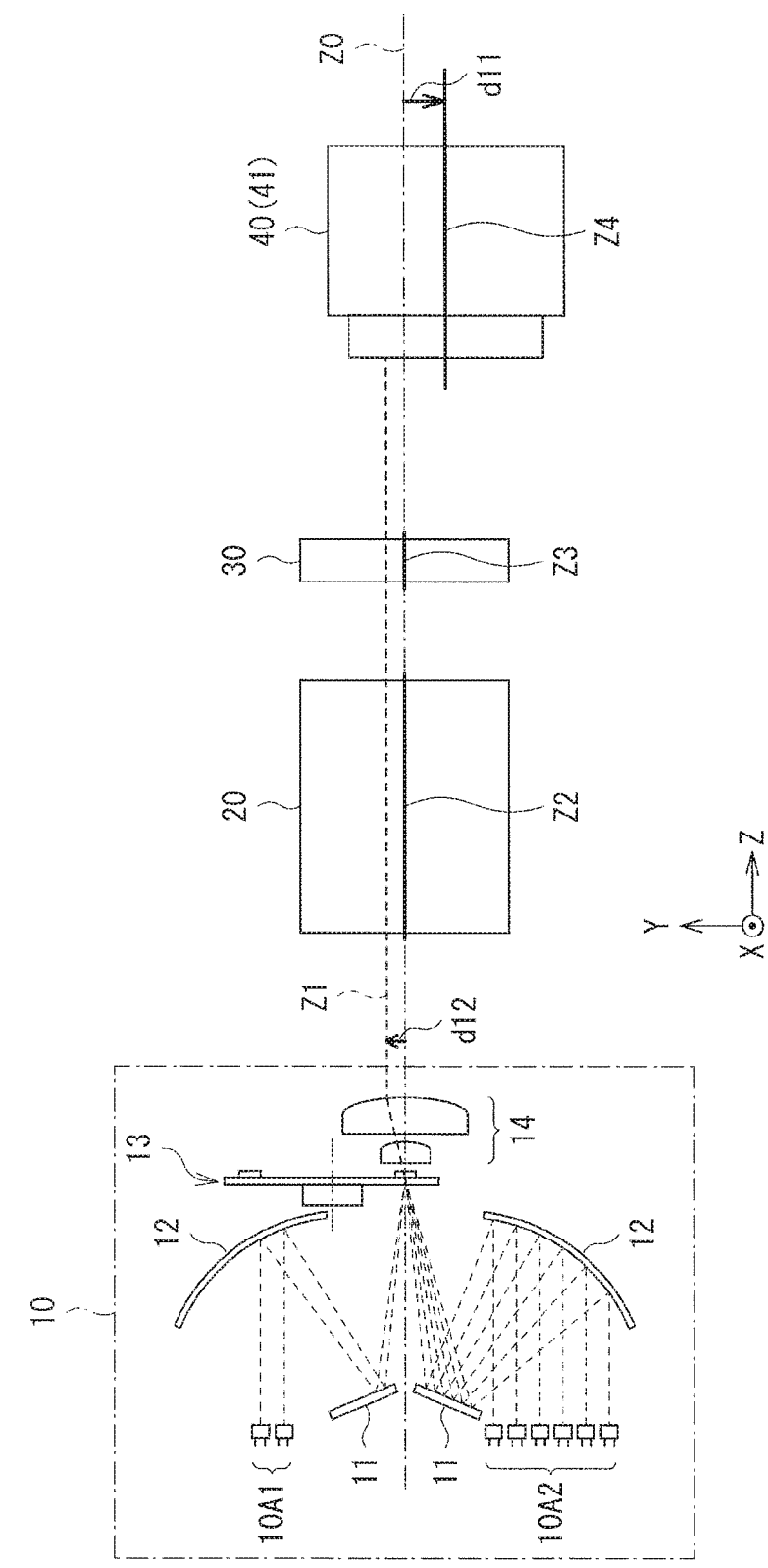
[FIG. 3]

[FIG. 4]
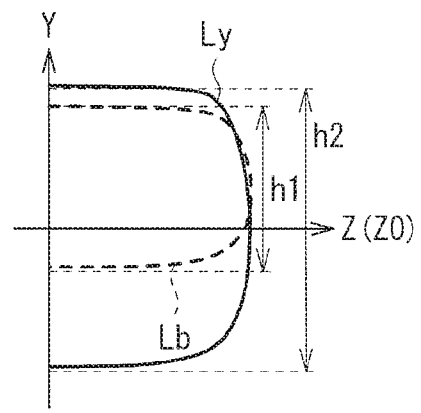
[FIG. 5]
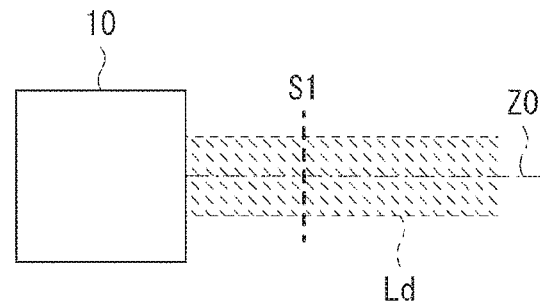

[FIG. 6]
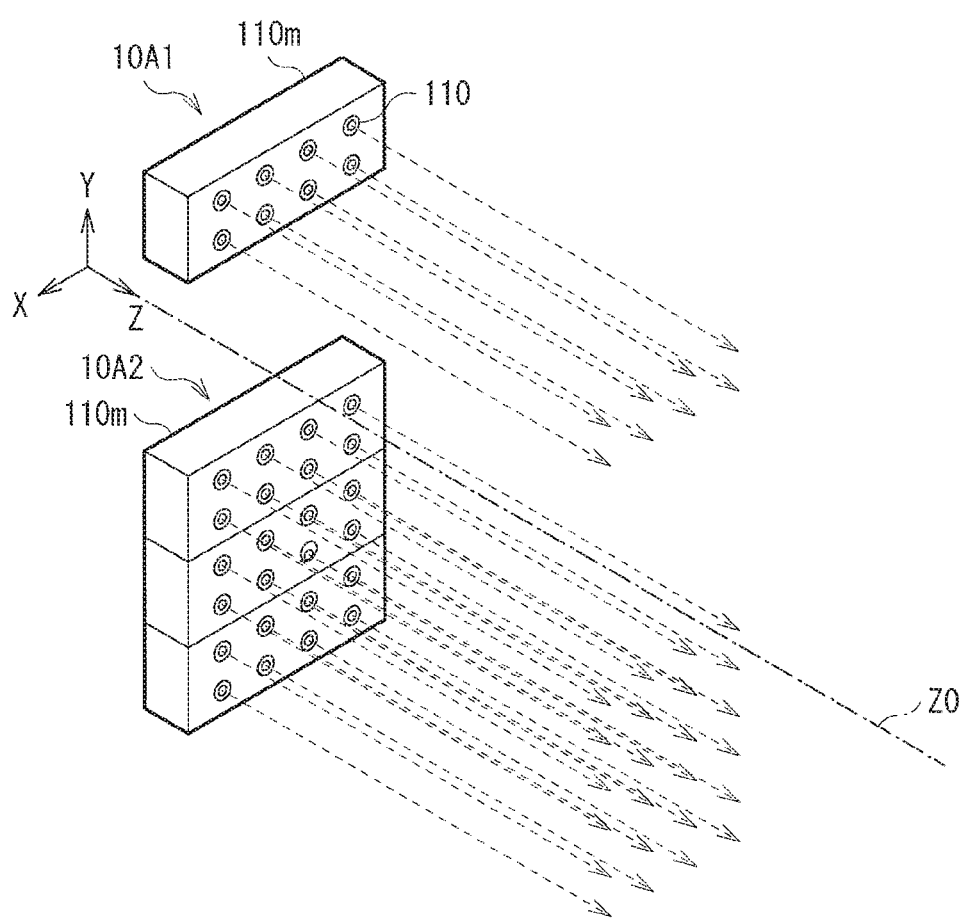

[FIG. 7]
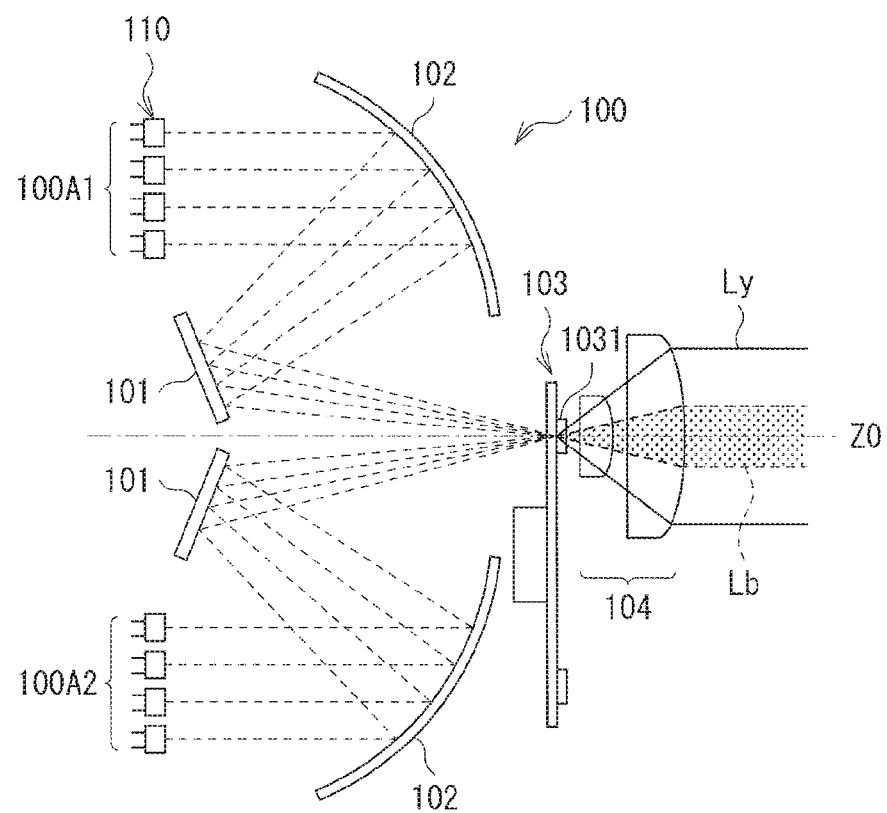
[FIG. 8]
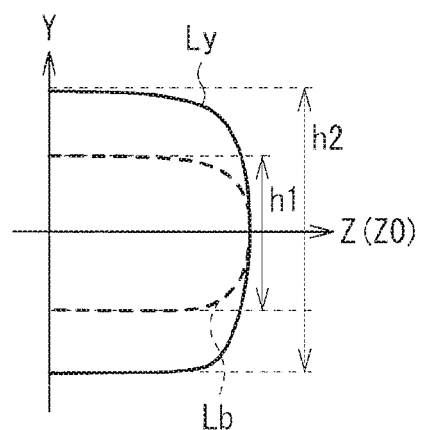

[FIG. 9]
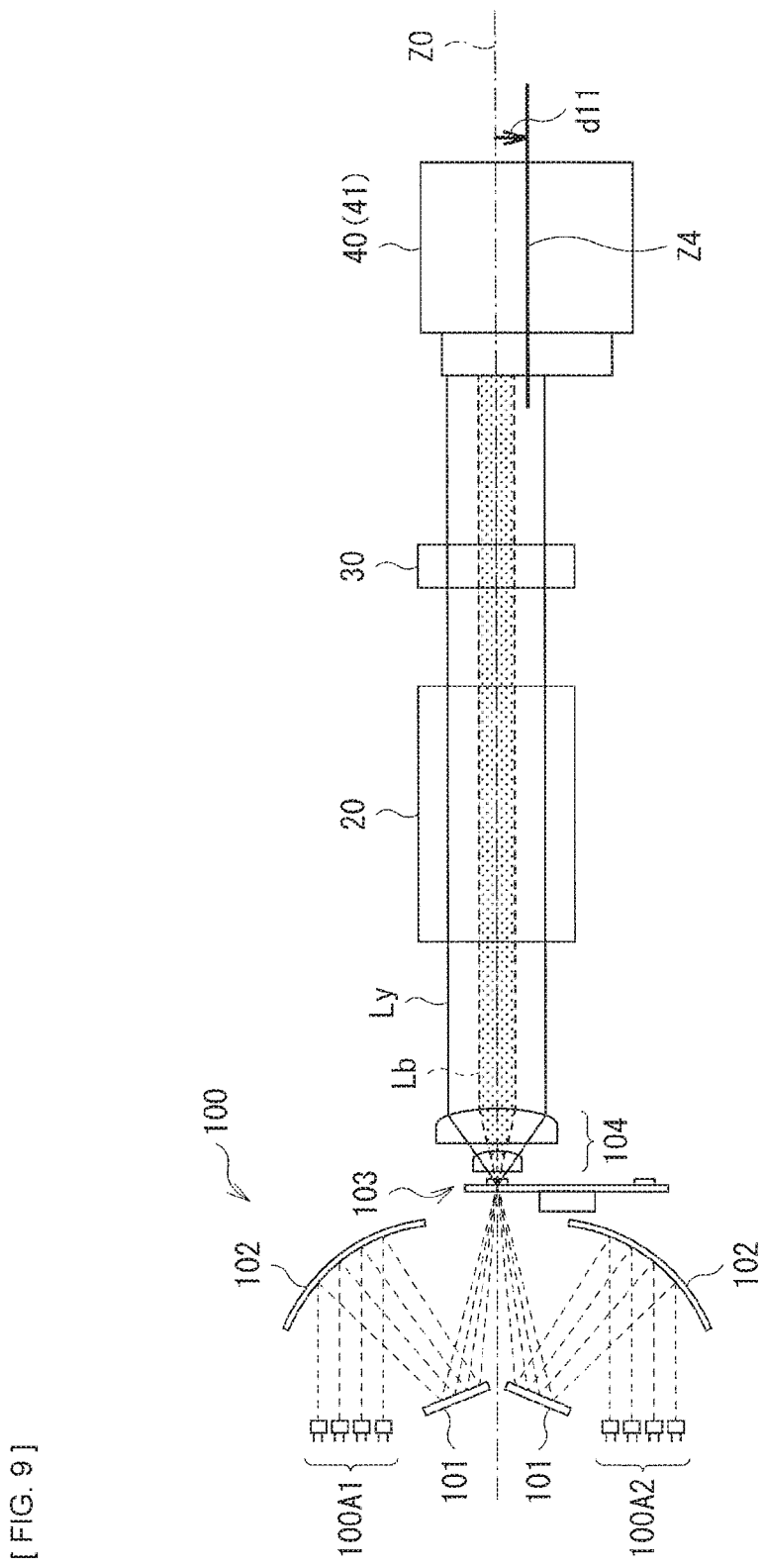

[ FIG. 10A ]
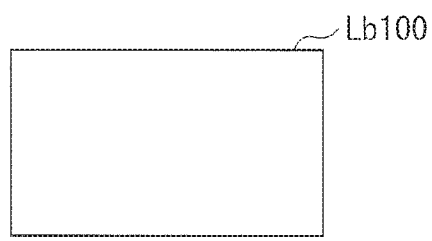
[ FIG. 10B ]
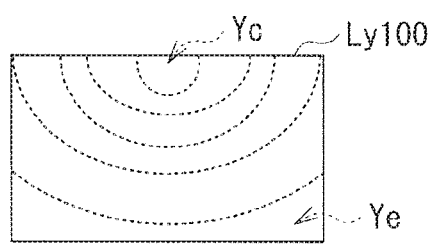
[ FIG. 10C ]
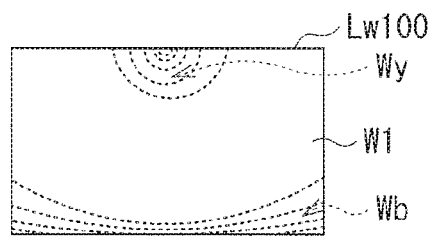

[FIG. 11]
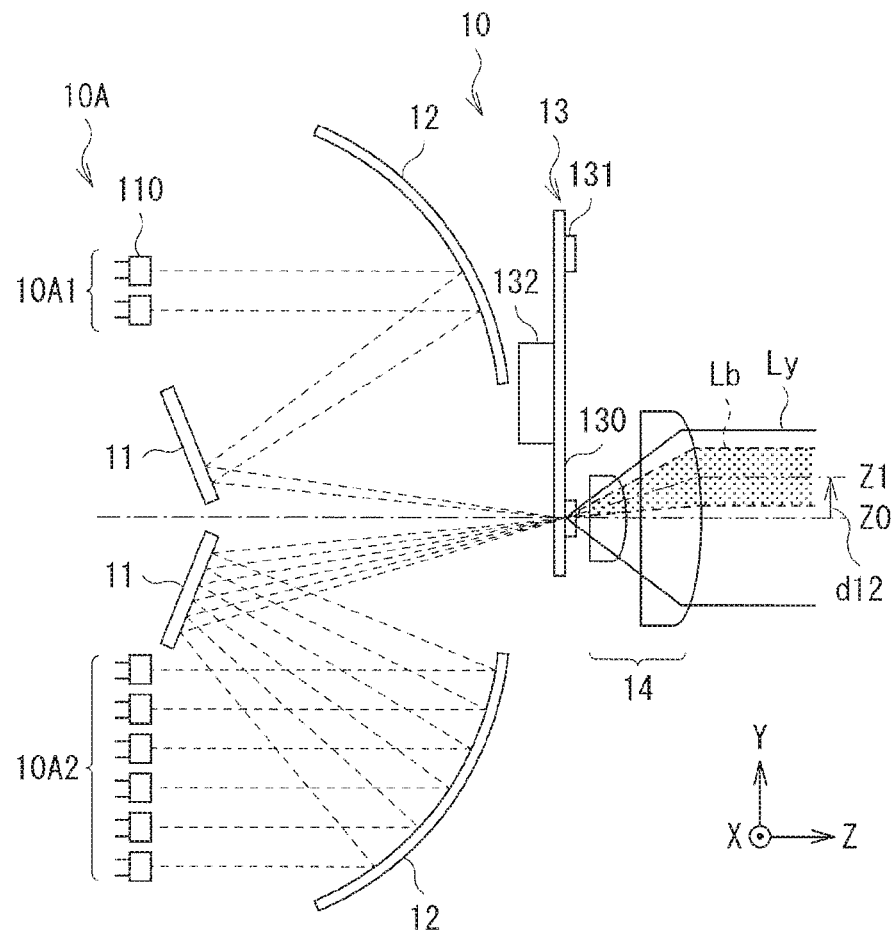
[FIG. 12]
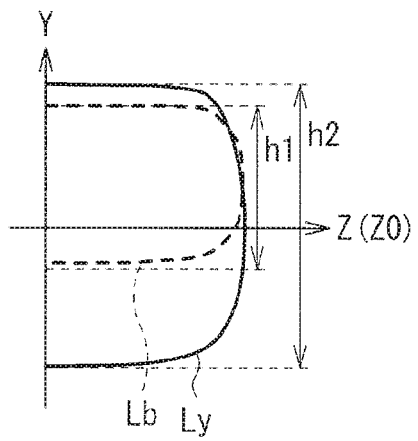
INTENSITY DISTRIBUTION

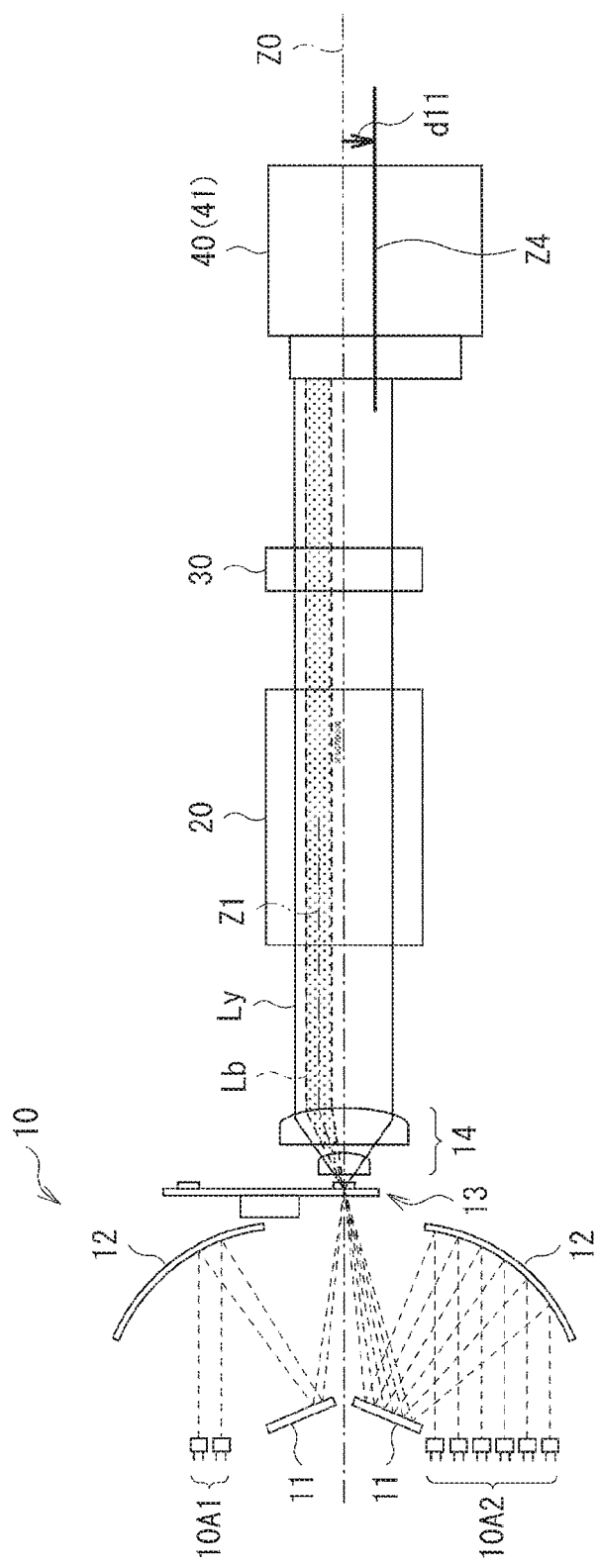
[FIG. 13]

[ FIG. 14A ]
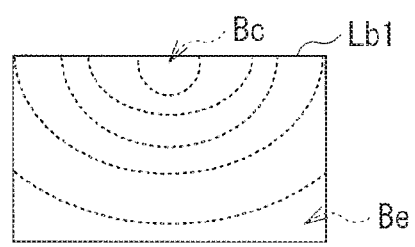
[ FIG. 14B ]
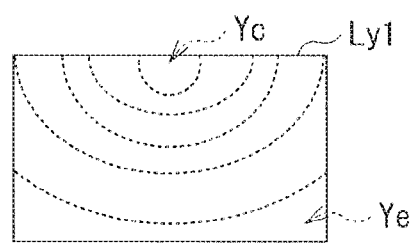
[ FIG. 14C ]
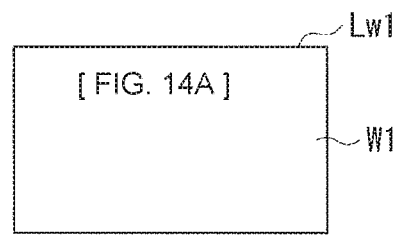

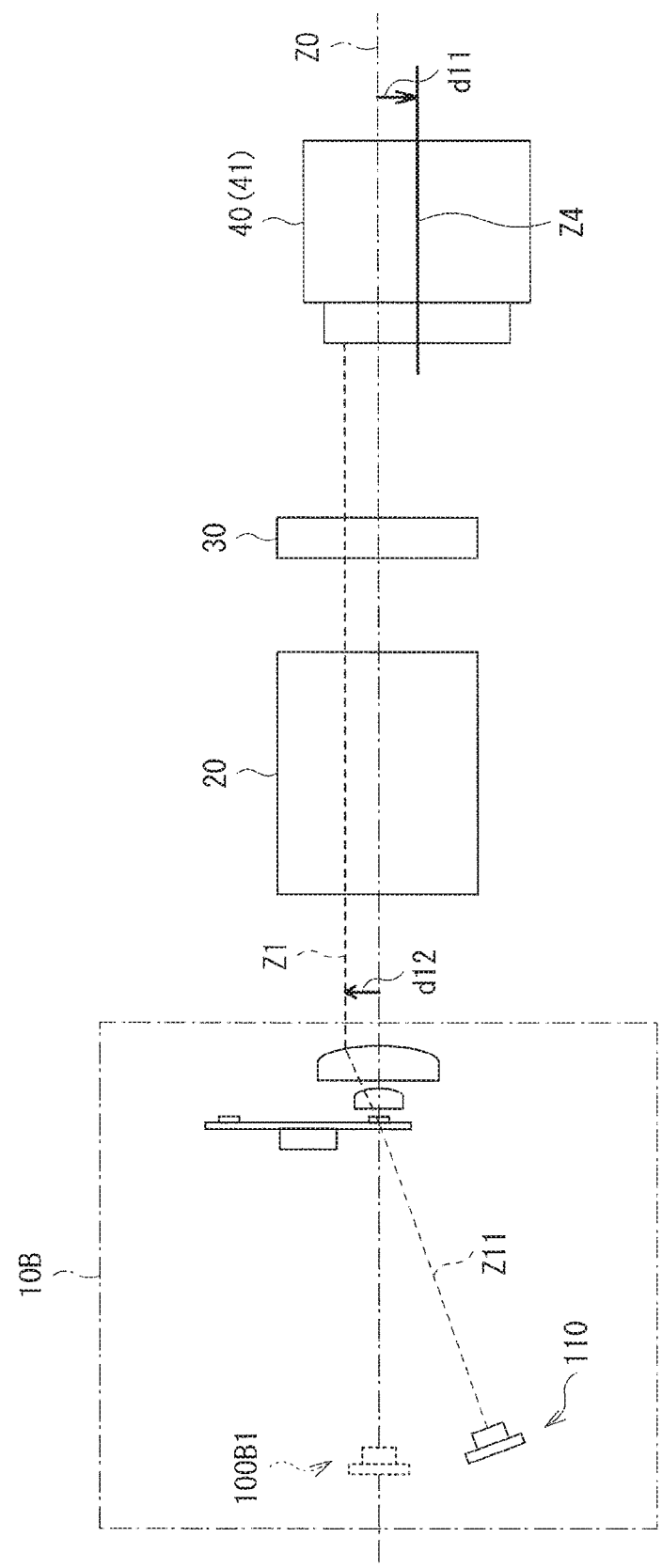
[FIG. 15]

PROJECTION DISPLAY DEVICE

CROSS REFERENCE TO RELATED APPLICATIONS

This application is a U.S. National Phase of International Patent Application No. PCT/JP2017/011206 filed on Mar. 21, 2017, which claims priority benefit of Japanese Patent Application No. JP 2016-089056 filed in the Japan Patent Office on Apr. 27, 2016. Each of the above-referenced applications is hereby incorporated herein by reference in its entirety.

TECHNICAL FIELD

The disclosure relates to a projection display device such as a projector.

BACKGROUND ART

Recently, a projection display device such as a projector employs a light source device that emits pieces of color light each having a wavelength different from one another from a plurality of light source parts using a fluorescence conversion wheel or the like and combines the pieces of color light to generate illumination light.

Various techniques have been proposed for suppressing color unevenness of the pieces of emitted light in such a light source device (for example, refer to PTL 1).

CITATION LIST

Patent Literature

PTL 1: Japanese Unexamined Patent Application Publication No. 2011-100102

SUMMARY OF THE INVENTION

It is desirable to improve display quality by reducing color unevenness without performing correction by signal processing and without adding any optical member for correction.

It is desirable to provide a projection display device that makes it possible to improve the display quality with a simple configuration.

A projection display device according to an embodiment of the disclosure includes a light source part including a first light source part that emits first color light and a second light source part that emits second color light having an emission intensity distribution different from that of the first color light, an image generator that generates an image on the basis of light emitted from the light source part, and a projection lens that projects light outputted from the image generator onto a projection surface and has a projection optical axis that is shifted from a reference optical axis of the device as a whole, in which an emission optical axis of the first light source part is shifted to a direction opposite to a direction of the projection optical axis having been shifted.

With the projection display device according to an embodiment of the disclosure, when an image generated on the basis of the pieces of first and second color light having different emission intensity distributions from each other is projected on the projection surface through the projection lens having its projection optical axis shifted, color unevenness may occur on a projection screen. Shifting the emission optical axis of the first light source part in the direction opposite to the shifting direction of the projection optical axis makes the luminance distributions of the pieces of first and second color light equal to each other on the projection screen, thereby reducing the color unevenness.

According to the projection display device of the embodiment of the disclosure, in the configuration in which the image based on the pieces of first and second color light having different emission intensity distributions from each other is projected on the projection surface through the projection lens having its projection optical axis shifted, the emission optical axis of the first light source part is shifted in the direction opposite to the direction of the projection optical axis having been shifted. This makes it possible to reduce the color unevenness on the projection screen without performing correction by signal processing and without adding any optical member for the correction. It is thus possible to improve the display quality with the simple configuration.

It is to be noted that the contents described above are merely examples of the disclosure. Effects of the disclosure are not necessarily limited to the effects described above, and may be or may further include any other effect.

BRIEF DESCRIPTION OF DRAWING

FIG. 1 is a schematic view of an outline configuration of a projection display device according to an embodiment of the disclosure.

FIG. 2 is a schematic view of a configuration of a light source part illustrated in FIG. 1.

FIG. 3 is a diagram illustrating optical axis shift of a first light source part.

FIG. 4 is a characteristic diagram illustrating emission intensity distributions of the first light source part and a second light source part illustrated in FIG. 2.

FIG. 5 is a schematic view for illustrating the emission intensity distribution.

FIG. 6 is a schematic view of an example configuration of the first light source part illustrated in FIG. 2.

FIG. 7 is a schematic view of a configuration of a light source part and an emission optical path according to a comparison example.

FIG. 8 is a characteristic diagram illustrating emission intensity distributions of a first light source part and a second light source part illustrated in FIG. 7.

FIG. 9 is a schematic view for illustrating a main part configuration and workings of a projection display device including a light source part illustrated in FIG. 7.

FIG. 10A is a schematic view of a luminance distribution of blue light emitted from the first light source part illustrated in FIG. 7.

FIG. 10B is a schematic view of a luminance distribution of fluorescence emitted from the second light source part illustrated in FIG. 7.

FIG. 10C is a schematic view of a white light generated by combining the blue light and the fluorescence that are respectively illustrated in FIGS. 10A and 10B.

FIG. 11 is a schematic view of the configuration of the light source part and an emission optical path illustrated in FIG. 1.

FIG. 12 is a characteristic diagram illustrating an emission intensity distributions of a first light source part and a second light source part illustrated in FIG. 11.

FIG. 13 is a schematic view for illustrating the main part configuration and the workings of the projection display device illustrated in FIG. 1.

FIG. 14A is a schematic view of a luminance distribution of blue light emitted from the first light source part illustrated in FIG. 11.

FIG. 14B is a schematic view of a luminance distribution of fluorescence emitted from the second light source part illustrated in FIG. 11.

FIG. 14C is a schematic view for illustrating white light generated by combining the blue light and the fluorescence that are respectively illustrated in FIGS. 14A and 14B.

FIG. 15 is a schematic view for illustrating a main part configuration of a projection display device according to a modification example.

MODES FOR CARRYING OUT THE INVENTION

In the following, embodiments of the disclosure are described in detail with reference to the drawings. It is to be noted that description is made in the following order.
1. First Embodiment (An example of a projection display device in which an optical axis of a first light source part is shifted in a direction opposite to a shifting direction of the optical axis of a projection lens)
2. Modification Examples (An example of the first light source part including a single laser light source)
(Configuration)

FIG. 1 illustrates an example configuration of a projection display device (projection display device 1) according to an embodiment of the disclosure. The projection display device 1 includes, on an optical axis Z0, a light source part 10, an illumination part 20, an image generator 30, and a projection lens 40, for example. The light source part 10, the illumination part 20, the image generator 30, and the projection lens 40 are drive-controlled by, for example, a control part that is not illustrated in the figures. It is to be noted that the optical axis Z0 corresponds to a specific example of a "reference optical axis" in the disclosure.

The light source part 10 emits white light, for example, as illumination light. Detailed configuration of the light source part 10 is illustrated in FIG. 2. The light source part 10 includes, for example, a first light source part 10A (first light source part), mirrors 11 and 12, a fluorescence conversion wheel 13 (wavelength conversion element) including a phosphor layer 131 as a second light source part, and a collimator optical system 14. The light source part 10 is configured to emit, for example, white light by mixing color light emitted by the first light source part 10A with color light emitted from the phosphor layer 131 (second light source part).

The first light source part 10A includes one or more (here, more than one) light sources 110. Each light source 110 includes, a semiconductor laser (LD), for example, and emits blue light (first color light), for example. The blue light has its intensity peak in a wavelength range of no less than 400 nm and no more than 500 nm, for example. In the light source part 10 that generates white light, the first light source part 10A functions as a source of blue light and also functions as an excitation light source for the fluorescence conversion wheel 13, for example. In the first light source part 10A, a plurality of light sources 110 are divided into two light source groups 10A1 and 10A2 that have the optical axis Z0 provided therebetween, for example. An arrangement configuration of the light sources 110 in each of the light source groups 10A1 and 10A2 will be described later.

The mirrors 11 and 12 condense the pieces of light emitted from the light source groups 10A1 and 10A2, and guide them to the phosphor layer 131 of the fluorescence conversion wheel 13. The mirror 12 is a concave reflecting mirror, for example, which reflects and condenses the light emitted from the first light source part 10A toward the mirror 11. The mirror 11 is configured to reflect the light reflected by the mirror 12 toward the phosphor layer 131. The first light source part 10A is configured such that each of pieces of emission light from the light source groups 10A1 and 10A2 are condensed, by these mirrors 11 and 12, at the substantially same point on the phosphor layer 131 of the fluorescence conversion wheel 13.

The fluorescence conversion wheel 13 has the phosphor layer 131 that absorbs a portion of the incident color light (excitation light) and outputs light (fluorescence) in a wavelength range different from that of the absorbed color light. Here, the fluorescence conversion wheel 13 has a function of outputting an unabsorbed portion (a portion that has not subjected to waveform conversion) of the incident color light. Here, the fluorescence conversion wheel 13 has a so-called transmissive configuration. In other words, when the excitation light (such as blue light) enters the wheel, the unabsorbed portion thereof is transmitted therethrough and outputted therefrom, where an outputting direction of the blue light is substantially the same as an outputting direction of the fluorescence (such as yellow light).

The fluorescence conversion wheel 13 includes, for example, a substrate 130, the phosphor layer 131 held on or in the substrate 130, and a motor 132 that rotationally drives the substrate 130. Although a configuration is exemplified here in which the fluorescence conversion wheel 13 is rotatable, the fluorescence conversion wheel 13 may not be rotatable depending on excitation energy of the phosphor layer 131 and the like.

The substrate 130 is, for example, a disk-shaped rotating body (wheel), which is rotatable around an axis C1 by driving of the motor 132, for example. The substrate 130 includes a material having high thermal conductivity such as metal/alloy-based materials, ceramic-based materials, ceramic-metal mixtures, crystals such as sapphire, diamond, and glass. Exemplary metal/alloy-based materials include Al, Cu, Mo, W, and CuW. Exemplary ceramic-based materials include SiC, AN, $Al_2O_3$, $Si_3N_4$, $ZrO_2$, and $Y_2O_3$. Exemplary ceramics-metal mixture-based materials include SiC—Al, SiC—Mg, and SiC—Si.

The phosphor layer 131 is disposed along a circumference in a plane of the substrate 130 (in an annular region), for example. A portion of the phosphor layer 131 is configured to be disposed on an optical axis Z0 in a time dividing manner by the rotation of the substrate 130. When light having a predetermined wavelength (incident light) enters the phosphor layer 131, the phosphor layer 131 emits light having a wavelength different from that of the incident light as excited by the light having a predetermined wavelength (the incident light). As an example, the phosphor layer 131 includes a fluorescent substance that emits yellow fluorescence (yellow light) excited by blue light. Examples of such a fluorescent substance include YAG-based phosphor (such as $Y_3Al_5O_{12}$) that generates yellow fluorescence as excited by blue light having its center wavelength at about 445 nm. The YAG-based phosphor may be doped with Ce, for example. Examples of Other fluorescent substances included in the phosphor layer 131 include oxide phosphor, oxynitride phosphor, nitride-based phosphor, sulfide phosphor, and silicate-based phosphor. An example of the oxynitride phosphor may be BSON phosphor (such as $Ba_3Si_6O_{12}N_2$:$Eu^{2+}$). An example of the nitride-based phosphor may be CASN phosphor (such as $CaAlSiN_3$:Eu) or SiAlON phosphor. An example of the sulfide phosphor may be SGS phosphor (such as SrGa$_2$S$_4$:Eu). An example of the silicate-based phosphor may be TEOS phosphor (such as Si(OC$_2$H$_5$)$_4$).

The phosphor layer 131 includes powder phosphor and binder (such as a silicon material) that holds the powder phosphor, for example. It is to be noted that the powder phosphor included in the phosphor layer 131 may be various phosphors described above, for example. Alternatively, the phosphor layer 131 may be a polycrystal plate including a phosphor material. The polycrystal plate is formed by processing a polycrystal material including the phosphor material in a plate-like shape.

The fluorescence emitted from the phosphor layer 131 is yellow light (second color light), for example, which has its intensity peak in a wavelength range encompassing the wavelength range of green color and the wavelength range of red color (for example, no less than 480 nm and no more than 700 nm).

The collimator optical system 14 is an optical system that is disposed on the light output side of the fluorescence conversion wheel 13 and that parallelizes incident light, and includes one or more lenses, for example.

The illumination part 20 splits light (white light) emitted from the light source part 10 into a plurality of pieces of color light, and equalizes the luminance distribution of the illumination light. The illumination part 20 includes, for example, an integrator element, a polarization converter element, a condenser lens, and a dichroic mirror, though not illustrated in the drawings.

The image generator 30 modulates each piece of color light entered from the illumination part 20 and generates image light of each color on the basis of an image signal corresponding to each color input from the outside. The image generator 30 includes, for example, a light valve 30R for red light, a light valve 30G for green light, a light valve 30B for blue light, polarization beam separator prisms (PBSs) 31 and 32, and a color synthesis prism 33.

The light valve 30R modulates red light input from the illumination part 20 and generates red image light on the basis of the image signal corresponding to red light input from the outside. The light valve 30G modulates green light input from the illumination part 20 and generates green image light on the basis of the image signal corresponding to green light input from the outside. The light valve 30B modulates blue light input from the illumination part 20 and generates blue image light on the basis of the image signal corresponding to blue light input from the outside. The light valves 30R, 30G, and 30B may use a reflective liquid crystal element such as an LCOS (Liquid Crystal On Silicon). It is noted, however, that the light valve is not limited to such a liquid crystal element but a DMD (Digital Micromirror Device) may be used, for example.

The polarization beam separator prisms 31 and 32 are optical elements configured to transmit a first polarization component and reflect a second polarization component. The polarization beam separator prism 31 is configured to output red light to the light valve 30R and blue light to the light valve 30B by receiving the red light as the first polarization component and the blue light as the second polarization component, for example. Pieces of image light of red color and blue color generated by the light valves 30R, 30B are emitted to the polarization beam separator prism 31 with their polarization state rotated. The pieces of image light of red color and blue color are combined at the polarization beam separator prism 31 and input to the color synthesis prism 33. The polarization beam separator prism 32 is configured to output green light to the light valve 30G by reflection after the green light is input as the first or second polarization component, for example. The image light of green color generated at the light valve 30G is outputted to the polarization beam separator prism 32 with its polarization state rotated. The image light of green color transmits the polarization beam separator prism 32 and enters the color synthesis prism 33.

The color synthesis prism 33 combines the pieces of image light of red color, green color, and blue color thus input and outputs the resulting light to the projection lens 40.

The projection lens 40 includes, for example, a lens group 41 and a mirror 42. The lens group 41 includes a plurality of lenses and may be of a so-called short focus type or a long focus type. However, an effect by the optical axis shift of the first light source part 10A according to the present embodiment is especially effective to those of the short focus type (alternatively, ultra-short focus type). A throw ratio (Throw Ratio) of the ultra-short focus type lens is, for example, 0.38 or lower. The throw ratio corresponds to a ratio of a distance from the lens group 41 to a projection surface 200 to a width of a projection screen provided on the projection surface 200.

The projection optical axis of the projection lens 40 (emission optical axis of the lens group 41) is shifted with respect to the optical axis Z0.

(Regarding Optical Axis Shift of First Light Source Part 10A)

FIG. 3 illustrates a positional relationship among the optical axis Z0 of the projection display device 1, the emission optical axis of the first light source part 10A (optical axis Z1), the optical axis Z2 of the illumination part 20, the optical axis Z3 of the image generator 30, and the projection optical axis of the projection lens 40 (optical axis Z4). In this manner, the optical axis Z1 of the first light source part 10A is shifted in a predetermined direction (direction d12) from the optical axis Z0 in the light source part 10. It is desirable that a shift amount of the optical axis Z1 is set so that the luminance distributions of the blue light and the yellow light emitted from the light source part 10 are equal (luminance distributions match each other or difference between the luminance distributions is reduced) depending on the shift amount of the optical axis Z4 of the projection lens 40.

FIG. 4 illustrates emission intensity distributions of the blue light (light Lb) and the yellow fluorescence (light Ly) emitted from the light source part 10. The emission intensity distributions of the light Lb and Ly are different from each other as illustrated. The emission intensity distribution (intensity distribution) of light herein means, as schematically illustrated in FIG. 5, the intensity distribution of light (light flux) Ld emitted from the light source part 10 in a plane 51 orthogonal to the optical axis Z0. While the emission intensity distribution of the light Ly is formed symmetrically with respect to the optical axis Z0, the emission intensity distribution of the light Lb is shifted in the positive direction on the Y axis from the optical axis Z0 and thus it is formed asymmetrically with respect to the optical axis Z0. The light Ly serving as fluorescence is emitted isotropically regardless of an angle of incidence of the excitation light (the scattering angle is large), and thus the intensity distribution range (light flux diameter) h2 is relatively large. On the other hand, although the blue light Lb is diffused to some extent when transmitting the phosphor layer 131, the intensity distribution range (light flux diameter) h1 is smaller than the range h2 of the light Ly. In this manner, according to the present embodiment, the optical axis Z1 is shifted so that an optical path of the light Lb is formed in an off-centered region closer to the periphery of the optical path of the light Ly.

The optical axis Z1 of the first light source part 10A corresponds to the central axis of the light flux of the blue light to be emitted, and is shifted in the direction d12 (here, the positive direction on the Y axis) opposite to the shifting direction of the optical axis Z4 of the projection lens 40 (here, the negative direction on the Y axis d11).

Shifting the optical axis Z1 is achieved, for example, by disposing the number of the light sources 110 configuring the first light source part 10A asymmetrically with respect to the optical axis Z0.

As an example, the light sources 110 are set so that the numbers of the light sources 110 disposed in the light source groups 10A1 and 10A2 are different (the proportions of the light sources 110 disposed in the light source groups 10A1 and 10A2 are different). Specifically, as illustrated in FIG. 2, the light sources 110 are disposed so that the proportion of the light sources 110 disposed in the light source group 10A1 and the light source group 10A2 (number ratio) are not equal (1:3 in this example). Here, for the first light source part 10A, such a light source module (light source module 110m) as schematically illustrated in FIG. 6 is often used. The light source module 110m includes, for example, eight light sources 110 (laser modules) mounted thereon and equally spaced from one another in 2 rows and 4 columns, for example, and each light source 110 emits laser beam along the optical axis Z0 (Z-axis direction). One of such light source modules 110m is disposed above the optical axis Z0 (the positive side of Y axis), which allows the light source group 10A1 to be configured, and three of them are disposed below the optical axis Z0 (the negative side of Y axis), which allows the light source group 10A2 to be configured. In this manner, in the first light source part 10A, it is possible to shift the optical axis Z1 of the first light source part 10A from the optical axis Z0 along the direction d12 by increasing the number of the light sources 110 in the light source group 10A2 more than in the light source group 10A1.

[Workings and Effects]

With the projection display device 1 of the embodiment, for example, white light is generated in the light source part 10 and emitted to the illumination part 20. The illumination part 20 performs, for example, color separation and polarization conversion on the incident white light, and outputs the resulting light to the image generator 30. In the image generator 30, for example, images of R, G, and B colors (pieces of image light) are generated and combined, and the resulting light is outputted to the projection lens 40. A color image is displayed by the projection lens 40 projecting the image onto the projection surface 200.

At this time, the white light is generated in the light source part 10 in the following manner. That is, as illustrated in FIG. 2, the blue light emitted from the light source groups 10A1 and 10A2 of the first light source part 10A is reflected by the mirrors 11 and 12 toward the fluorescence conversion wheel 13 and condensed there. In the fluorescence conversion wheel 13, for example, the motor 132 rotationally drives the substrate 130, whereby a portion of the phosphor layer 131 held by the substrate 130 is disposed on the optical axis Z0 in a time dividing manner (in a cyclic manner). When the blue light enters the phosphor layer 131, a portion of the blue light is absorbed, and yellow light is outputted as fluorescence. The yellow light (light Ly) exits from the phosphor layer 131. On the other hand, another portion of the incident blue light (light Lb) that has not been absorbed by the phosphor layer 131 transmits the phosphor layer 131 without undergoing wavelength conversion and exits from the fluorescence conversion wheel 13 along the same direction as the yellow light. In this manner, the blue light Lb and the yellow light Ly serving as the fluorescence are outputted from the fluorescence conversion wheel 13.

The pieces of light Lb and Ly outputted from the fluorescence conversion wheel 13 enter the collimator optical system 14 and are made into parallel light by the collimator optical system 14. Color mixture of the pieces of light Lb and Ly generates the white light serving as the illumination light.

Here, FIG. 7 illustrates a configuration of the light source part (light source part 100) according to a comparison example of the embodiment. FIG. 8 illustrates the emission intensity distributions of the blue light and the yellow light emitted from the light source part illustrate in FIG. 7. FIG. 9 illustrates a main part configuration of the projection display device including the light source part 100 according to the comparison example.

The light source part 100 according to the comparison example includes, as with the light source part 10 according to the embodiment, light source groups 100A1 and 100A2 including a plurality of light sources 110, mirrors 101 and 102, a fluorescence conversion wheel 103, and a collimator optical system 104. In the light source part 100, however, a plurality of light sources 110 (light source groups 100A1 and 100A2) are disposed symmetrically with respect to the optical axis Z0. This allows color mixture of the pieces of light Ly and Lb exiting from the phosphor layer 1031 of the fluorescence conversion wheel 103 and the collimator optical system 104, to form the white light. Both of the emission intensity distributions of the pieces of light Ly and Lb emitted from the light source part 100 have symmetry with respect to the optical axis Z0, as illustrated in FIG. 8. Moreover, for the reason described above, the light Ly serving as the fluorescence has a relatively wide range h2 due to the large scattering angle whereas the intensity distribution range h1 of the blue light Lb is made smaller than the range h2 of the light Ly.

In the comparison example, the white light including the pieces of light Lb and Ly emitted from the light source part 100 advances along the optical axis Z0 through the illumination part 20, the image generator 30, and the projection lens 40 (lens group 41) in the order to be projected on the projection surface. Among the white light emitted from the light source part 100, the light Lb has its optical path along the central portion centered at the optical axis Z0, whereas the light Ly has a wider optical path ranging from the central portion to the peripheral portion. The intensity distribution ranges h1 and h2 (light flux diameters) of the pieces of light Lb and Ly emitted from the light source part 100 are thus different from each other. Moreover, in the projection lens 40, the optical axis Z4 is shifted from the optical axis Z0 along a direction d11, as in the embodiment.

However, when the image generated on the basis of the pieces of light Lb and Ly having different emission intensity distributions is projected on the projection surface through the projection lens 40 having the optical axis Z4 shifted as described above, color unevenness occurs on the projection screen.

One example is given in FIGS. 10A 10B, and 10C. FIG. 10A schematically illustrates a luminance distribution (Lb100) of the blue light Lb emitted from the light source part 100 on the projection screen. As can be seen, the luminance distribution Lb100 based on the blue light Lb exhibits a substantially uniform distribution with less unevenness. This is because the light Lb passes through the central portion close to the optical axis Z0 and therefore is less likely to be affected by limb darkening (reduction in the peripheral light amount) caused by the projection lens 40. FIG. 10B schematically illustrates the luminance distribution (Ly100) of the yellow light Ly emitted from the light source part 100 on the projection screen. While the luminance distribution Lb100 of the light Lb is substantially uniform, the luminance distribution Ly100 based on the yellow light Ly exhibits unevenness. Specifically, luminance is the highest (light amount is high) near an upper end central portion Yc, and tends to gradually decrease (the light amount decreases) from the upper end central portion Yc toward the lower end portion Ye. This results from the fact that the light Ly serving as the fluorescence passes through the peripheral portion of the projection lens 40 (lens group 41) to be easily affected by the limb darkening (reduction in the peripheral light amount) and that the optical axis Z4 of the projection lens 40 is shifted. Especially when the projection lens 40 is of the short focus type, the peripheral light amount drastically decreases according to the cosine fourth law. As described above, the reduction in the peripheral light amount due to the projection lens 40 and the shift of the optical axis Z4 cause such luminance unevenness as illustrated in FIG. 10B in the luminance distribution Ly100 of the light Ly. It is to be noted that a broken line in FIG. 10B schematically illustrates a change in luminance, and a broken line in FIG. 10C schematically illustrates a change in chromaticity.

In this manner, because the degrees of the reduction in the peripheral light amount due to the projection lens 40 are different depending on the difference of the emission intensity distribution ranges h1 and h2 (light flux diameters) of the pieces of light Lb and Ly, the luminance distributions Lb100 and Ly100 are different from each other as described above. The difference of the luminance distributions causes chromaticity unevenness. For example, such color unevenness as illustrated in FIG. 10C occurs to the luminance distribution Lw100 of the white light generated by combining the light Lb having the luminance distribution Lb100 illustrated in FIG. 10A and the light Ly having the luminance distribution Ly100 illustrated in FIG. 10B. Specifically, although the most portion of the luminance distribution Lw100 presents white color W1 having good balance between blue color and yellow color, a local portion such as a region corresponding to the upper end central portion Yc of the luminance distribution Ly100 presents yellowish white Wy (having a stronger degree of yellow than blue). Moreover, a region corresponding to the lower end portion Ye presents bluish white Wb (having a stronger degree of blue than yellow).

To the contrary, in the light source part 10 according to the embodiment, the optical axis Z1 of the first light source part 10A is shifted in the direction d12 opposite to the shifting direction (direction d11) of the optical axis Z4 of the projection lens 40. Specifically, as illustrated in FIG. 11, disposing, asymmetrically with respect to the optical axis Z0, the light source groups 10A1 and 10A2 in the first light source part 10A allows the optical axis Z1 of the light Lb emitted from the light source part 10 through the fluorescence conversion wheel 13 and the collimator optical system 14 to be shifted from the optical axis Z0 along the direction d12. As illustrated in FIG. 12, the intensity distribution of the light Lb emitted from the light source part 10 is shifted upward (the positive direction on the Y axis). As illustrated in FIG. 13, the light Lb emitted from the light source part 10 passes through the illumination part 20, the image generator 30, and the projection lens 40 in the order along the optical axis Z1 that is shifted from the optical axis Z0 to be projected on the projection surface 200. On the other hand, because the light Ly is emitted isotropically regardless of the angle of incidence of the incident light (blue light emitted from the first light source part 10A), the emission optical axis of the light Ly is not shifted. That is, the light Ly passes through the illumination part 20, the image generator 30, and the projection lens 40 in the order along the optical axis Z0 to be projected on the projection surface 200.

As illustrated in FIGS. 14A and 14B, shifting of the optical axis Z1 makes the luminance distribution Lb1 of the light Lb and the luminance distribution Ly1 of the light Ly emitted from the light source part 10 equal to each other. While the luminance distribution Ly1 of the light Ly tends to gradually decrease (the light amount decreases) from the upper end central portion Yc toward the lower end portion Ye, the luminance distribution Lb1 of the light Lb also tends to gradually decrease from the upper end central portion Bc toward the lower end portion Be. That is, the regions and degrees of occurrence of the luminance unevenness are equal in the luminance distributions Lb1 and Ly1. This is because shifting of the optical axis Z1 allows the light Lb to pass through a region of the projection lens 40 closer to its peripheral portion, thereby reducing the peripheral light amount as with the light Ly. It is to be noted that broken lines in FIGS. 14A and 14B schematically illustrate changes in luminance.

As a result, in the luminance distribution Lw1 of the white light generated by combining the light Lb having the luminance distribution Lb1 illustrated in FIG. 14A and the light Ly having the luminance distribution Ly1 illustrated in FIG. 14B, the color unevenness is reduced as illustrated in FIG. 14C. That is, it is possible to achieve the white color W1 without the yellowish or bluish portion as described in the above-mentioned comparison example (FIG. 10C) and well balancing between blue and yellow on the whole projection screen.

As described above, in the embodiment, an image based on the pieces of light Lb and Ly having different emission intensity distributions is projected on the projection surface 200 through the projection lens 40 with its projection optical axis (the optical axis Z4) shifted from the optical axis Z0. In such a configuration, the emission optical axis (optical axis Z1) of the first light source part 10A is shifted in the direction d12 opposite to the shifting direction (direction d11) of the optical axis Z4 of the projection lens 40. This makes it possible to reduce the color unevenness on the projection screen without performing correction by signal processing and without adding any optical member for the correction. It is thus possible to improve the display quality with the simple configuration.

Moreover, since it is possible to reduce the color unevenness without using an optical member for correction, the light use efficiency is not reduced. Furthermore, because signal processing for correction is unnecessary, the image quality is not degraded by such signal processing.

Next, a modification example of the above-mentioned embodiment is described. Hereinbelow, same reference numerals indicate components similar to those in the above-mentioned embodiment, and description thereof will be omitted as appropriate.

Modification Example 1

FIG. 15 illustrates a main part configuration of the projection display device including a light source part (light source part 10B) according to a modification example. Although the plurality of light sources 110 are used and the layout of the light sources 110 (e.g. number) is set asymmetrically with respect to the optical axis Z0 in order to shift the optical axis Z1 of the first light source part 10A in the light source part 10 of the above-mentioned embodiment, an approach for shifting the optical axis Z1 is not limited thereto. For example, there may be a single light source 110 as in the modification example. Here, in a case where a single light source is used, it is common to dispose the single light source on the optical axis Z0, similarly to a light source 100B1 indicated by a broken line. In the modification example, to shift the optical axis Z1 as described above, the emission optical axis of the light source 110 (optical axis Z11) is set to extend from an obliquely lower position with respect to the optical axis Z0 toward the fluorescence conversion wheel 13. This allows the emission optical axis of the light source part 10 (optical axis Z1) to be shifted from the optical axis Z0 along the direction d12, as in the above-mentioned embodiment.

Although description is made above with reference to the embodiments and the modification example, the disclosure is not limited to the above-mentioned embodiments and the like and various modifications are possible. For example, the components of the optical system listed in the above-mentioned embodiments and the like (such as the light source part, the illumination part, the image generator, and the projection lens) are merely examples. Not all the components may necessarily be included, or another component may be further included. It is to be noted that the effects described herein are merely examples and not limited to the description but there may be another effect.

Moreover, although description is made taking an example of using the blue light as the first color light of the disclosure and the yellow light as the second color light in the above-mentioned embodiments and the like, the combination of the pieces of the first and second color light is not limited thereto. The pieces of the first and second color light may be those having different wavelength ranges depending on the type of the light source and properties of the phosphor. Each light may also be a combination of two or more pieces of different color light, such as pieces of blue, green and red light. Furthermore, the light is not limited to those in the visible range but light in the invisible range such as the ultraviolet range may be used.

Furthermore, although the above-mentioned embodiments and the like are described taking an example of a configuration using the transmissive fluorescence conversion wheel 13 in the light source part, a reflective type or a transmissive/reflective type may be used. The configuration has only to include a light source part that emits the first color light and the second color light having different emission intensity distributions. Moreover, although the above-mentioned embodiments exemplify a configuration in which the light source that emits the first color light also takes a role of an excitation light source that emits the second color light, the disclosure is not limited thereto but a light source that emits the first color light and an excitation light source that emits the second color light may be disposed separately.

Moreover, for example, the disclosure may have the following configuration.

(1)

A projection display device, including:

a light source part including a first light source part that emits first color light and a second light source part that emits second color light having an emission intensity distribution different from that of the first color light;

an image generator that generates an image on the basis of light emitted from the light source part; and a projection lens that projects light outputted from the image generator onto a projection surface and has a projection optical axis that is shifted from a reference optical axis of the device as a whole, an emission optical axis of the first light source part being shifted to a direction opposite to a direction of the projection optical axis having been shifted.

(2)

The projection display device according to (1), in which the first light source part includes a plurality of light sources, and the plurality of light sources are disposed asymmetrically with respect to the reference optical axis.

(3)

The projection display device according to (2), in which each of the plurality of light sources includes a laser light source.

(4)

The projection display device according to any one of (1) to (3), in which the second light source part includes a wavelength conversion element, the wavelength conversion element absorbing at least a portion of incident light, converting the portion into the second color light, and outputting the second color light.

(5)

The projection display device according to (4), in which the wavelength conversion element is disposed on light emission side of the first light source part, absorbs a portion of the first color light emitted from the first light source part, and outputs the second color light.

(6)

The projection display device according to any one of (1) to (5), in which the light source part emits white light by mixing the color light emitted from the first light source and the color light emitted from the second light source part.

(7)

The projection display device according to (6), in which the first color light is blue light, and the second color light is yellow light.

(8)

The projection display device according to any one of (1) to (7), in which the projection lens is a short focus type lens.

This application claims the priority of Japanese Priority Patent Application JP2016-89056 filed with the Japanese Patent Office on Apr. 27, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A projection display device, comprising:
a light source part that includes a first light source part and a second light source part, wherein
the first light source part is configured to emit first color light,
the second light source part is configured to emit second color light,
an emission intensity distribution of the second color light is different from an emission intensity distribution of the first color light,
the first light source part includes a plurality of light sources, and an arrangement of the plurality of light sources is asymmetric with respect to a reference optical axis of the projection display device;

an image generator configured to generate an image based on the emitted first color light and the emitted second color light; and a projection lens configured to project the generated image onto a projection surface, wherein a projection optical axis of the projection lens is shifted from the reference optical axis of the projection display device in a first direction, an emission optical axis of the first light source part is shifted from the reference optical axis of the projection display device in a second direction, and the first direction is opposite to the second direction.

2. The projection display device according to claim 1, wherein each of the plurality of light sources comprises a laser light source.

3. The projection display device according to claim 1, wherein the second light source part is further configured to receive incident light, the second light source part includes a wavelength conversion element, and the wavelength conversion element is configured to:
absorb at least a portion of the incident light,
convert the absorbed portion of the incident light into the second color light, and
output the second color light.

4. The projection display device according to claim 3, wherein the wavelength conversion element is on light emission side of the first light source part, and the wavelength conversion element is further configured to:
absorb a portion of the first color light emitted from the first light source part, and
output the second color light based on the absorbed portion of the first color light.

5. The projection display device according to claim 1, wherein the light source part is configured to:
combine the first color light emitted from the first light source part and the second color light emitted from the second light source part; and
emit white light based on the combination of the emitted first color light and the emitted second color light.

6. The projection display device according to claim 5, wherein the first color light comprises blue light, and the second color light comprises yellow light.

7. The projection display device according to claim 1, wherein the projection lens comprises a short focus type lens.

* * * * *